United States Patent [19]

Bell et al.

[11] 4,241,930
[45] Dec. 30, 1980

[54] TWO-WHEELED DOLLY

[76] Inventors: Dwain C. Bell, 1400 Marshall St. NE., Minneapolis, Minn. 55413; Lloyd E. Anderson, 6408 - 74th Ave. North, Minneapolis, Minn. 55428

[21] Appl. No.: 954,407

[22] Filed: Oct. 25, 1978

[51] Int. Cl.³ .............................................. B62B 1/04
[52] U.S. Cl. ................................................. 280/47.29
[58] Field of Search ............... 280/47.24, 47.21, 47.29, 280/47.27; 414/490

[56] References Cited

U.S. PATENT DOCUMENTS

| | | | |
|---|---|---|---|
| 2,417,553 | 3/1947 | Jensen | 280/47.21 X |
| 2,497,440 | 2/1950 | Denny | 280/47.29 |
| 2,600,577 | 6/1952 | Roe | 280/47.24 X |
| 3,104,889 | 9/1963 | Branch, Jr. | 280/47.29 X |
| 3,377,081 | 4/1968 | Ude | 280/47.27 |
| 3,556,548 | 1/1971 | Aplia | 280/47.27 |
| 3,663,033 | 5/1972 | Story | 280/47.27 |
| 3,927,898 | 12/1975 | Weyrauch | 280/47.27 |
| 4,009,891 | 3/1977 | Jensen | 280/47.27 X |

Primary Examiner—John J. Love
Assistant Examiner—Michael Mar
Attorney, Agent, or Firm—Orrin M. Haugen; Thomas J. Nikolai

[57] ABSTRACT

A two-wheel hand truck which includes a generally rectangular frame having parallel and spaced apart side members and cross members with a hinged or foldable toe plate which allows it to project forwardly from the plane of the frame or, alternatively, can be folded flush to the frame. The wheels are mounted outboard from the sides of the frame and project rearwardly therefrom to thereby provide increased stability. Handles are adapted to be connected to the upper portion of the frame and they too project rearwardly. The diameter of the wheels and the length of the handles are dimensioned such that when the cart is laid down with the ends of the handles abutting the ground, the plane of the cart is generally horizontal. First and second elongated rollers are journaled for rotation between the aforementioned cross members to thereby facilitate the dispensing of carpeting and the like from a roll.

2 Claims, 4 Drawing Figures

TWO-WHEELED DOLLY

BACKGROUND OF THE INVENTION

I. Field of the Invention

This invention relates generally to the novel design of a hand cart used for transporting articles in a warehouse and the like and more specifically to a two-wheeled hand truck which may be used for multiple purposes.

II. Description of the Prior Art

Many forms of two-wheeled hand trucks are known in the art. Such carts have been used for many years in facilitating the transport of bagged and/or boxed articles. In use, the toe plate of the cart is placed beneath the article to be transported and the cart is tipped rearward to elevate the article so that it may be wheeled about on the cart. Typical of such a prior art cart is that shown in the Weyrauch U.S. Pat. No. 3,927,898. While the hand cart of the Weyrauch Patent may be altogether suitable for handling articles such as cartons or sacks of grain and the like, it cannot be readily utilized for transporting and handling large rolls of material such as carpeting, linoleum, etc.

SUMMARY OF THE INVENTION

In accordance with the teachings of the present invention, there is provided a two-wheeled hand cart which embodies a number of design features making it readily suitable for transporting and dispensing roll materials. More specifically, there is provided a hand truck of the type including a frame assembly which includes a pair of spaced apart, longitudinally extending side members which are held in a parallel and spaced apart relationship by first and second transversely extending cross members. A pair of wheels are attached to the frame such that they are disposed somewhat outboard from the side edges of the longitudinally extending side members and rearward therefrom to thereby increase the lateral stability of the cart when it is in use. Hingedly secured at the lower end of the frame is a toe plate which can be made to assume either a first or a second orientation during use. In its first orientation, the toe plate projects forwardly from the frame so as to be in contact with the ground when the hand cart is resting on its two wheels. In its other orientation, the toe plate may be folded upwardly against the frame so as to be in a flush orientation therewith.

Handle means are provided at the upper end of the frame and project rearwardly at a desired angle to facilitate use by an operator. The length of the handles with respect to the diameter and mounting arrangement of the wheels is such that when the cart is tipped backwards with the ends of the handles abutting the ground, the frame is oriented in a generally horizontal position.

Disposed between the first and second transversely extending cross members are first and second elongated rollers which are journaled for rotation about axes which are generally parallel to the longitudinally extending side members. These rollers are spaced apart from one another so as to define a cradle for roll goods. Thus, when the toe plate is aligned flush with the frame and the frame is disposed in its horizontal orientation with the handle means abutting the ground, a sheet of material can be readily dispensed from the roll.

The side members and cross members are preferably formed from tubular metal having a rectangular cross section. It is found that this construction offers increased rigidity over circular tubing and provides an aesthetically pleasing appearance to the unit.

OBJECTS

It is accordingly the principal object of the present invention to provide a new and improved two-wheeled hand cart.

Another object of the invention is to provide a two-wheeled hand cart that is readily suited to multiple applications.

A still further object of the invention is to provide a two-wheeled hand cart which is especially designed for transporting and dispensing rolled yard goods.

A yet further object of the invention is to provide a two-wheeled hand cart that is very stable in use due to the manner in which the wheels thereof are mounted with respect to the frame.

A yet further object is to provide a hand cart which is relatively inexpensive to manufacture but which is extremely rugged, thereby ensuring a relatively long useful life.

These and other objects and advantages of the invention will become apparent to those skilled in the art from the following detailed description of the preferred embodiment when considered in light of the accompanying drawings in which like numerals in the several views refer to corresponding parts.

DESCRIPTION OF THE PREFERRED EMBODIMENT

Figure 1:
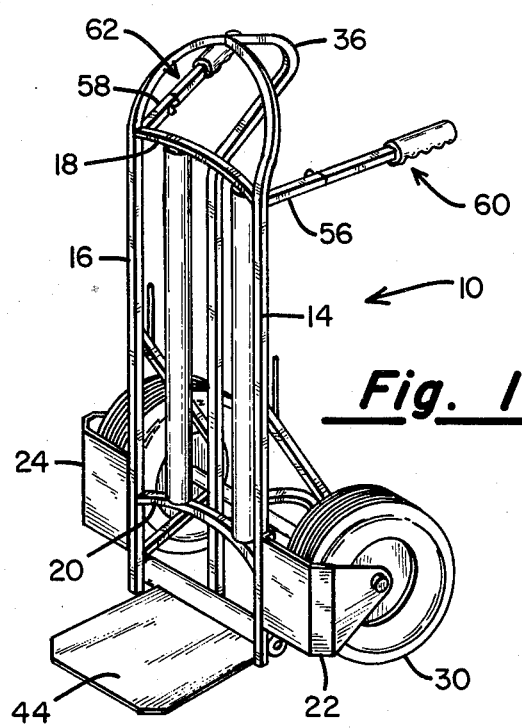
FIG. 1 is a perspective view of the preferred embodiment when oriented in its upright position.

Referring first to FIG. 1, there is indicated generally by numeral 10 a two-wheeled dolly or hand cart embodying the present invention. The hand cart includes a frame 12 which includes first and second longitudinally extending side members 14 and 16 which are generally disposed in a parallel and spaced apart relationship with respect to one another and are held in that orientation by means of transversely extending cross members 18 and 20. The side members 14 and 16 as well as the cross members 18 and 20 are preferably formed from metal tubing having a rectangular cross section.

Located proximate the lower end of the frame 12 and welded or otherwise attached to the outer surfaces of the side members 14 and 16 are first and second L-shaped fender members 22 and 24 which project outwardly for a predetermined distance and then rearwardly. As can best be observed from the view of FIG. 4, extending between the rearwardly projecting portions of the fender members 22 and 24 is a metal rod or tube 26 which passes through holes drilled through the side surfaces of the fender members 22 and 24. End caps 28 are attached to the ends of the member 26 to prevent snagging of these end portions during use.

Figure 4:
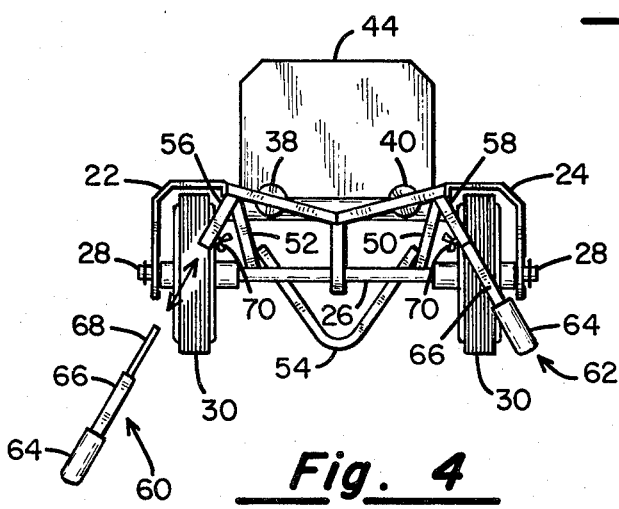
FIG. 4 is a top view which illustrates further features of the construction of the device.

As can also be seen from FIG. 4, the rod or tube member 26 serves as an axle for the two wheels 30 which are suitably mounted on the axle 26 and journaled for rotation thereabouts. The wheels 30 may have pneumatic or solid tires. The tires are preferably sized so as to facilitate the use of the hand cart on stairs. That is, it is desired that the wheels be of a size such that they will engage both the vertical riser and the horizontal step during upward or downward progress on stairs.

Figure 2:
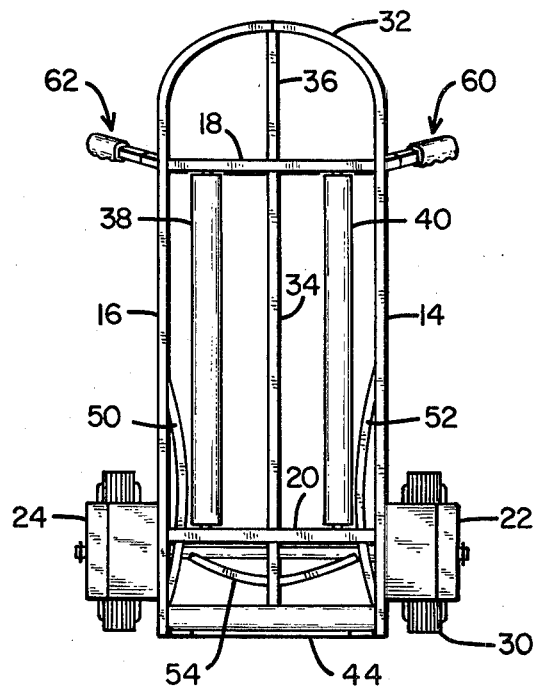
FIG. 2 is a front view of the embodiment of FIG. 1.

As is best illustrated in FIGS. 1 and 2, the side members 14 and 16 are terminated at their upper ends by a U-shaped portion 32 which extends between these side members. To provide additional rigidity and strength, a centrally disposed structural member 34 is provided which includes an integrally formed upper U-shaped portion 36, the purpose of which will be later described, the structural member 34 being welded to or otherwise attached to the cross members 18 and 20.

It is also to be noted from the perspective view of FIG. 1, that the cross members 18 and 20 are curved rearwardly such that they effectively form a cradle for articles in roll form. Extending between the cross members 18 and 20 and journaled for rotation therein are first and second elongated rollers 38 and 40. These rollers extend generally parallel to the longitudinal direction of the frame 12 and are disposed on either side of the structural member 34, approximately midway between the sides 14 and 16 and the structural member 34. The diameter of the rollers 38 and 40 and the center-to-center spacing therebetween are such that such goods as carpet rolls and the like will abut the rollers, but will not touch or otherwise engage the structural member 34.

Figure 3:
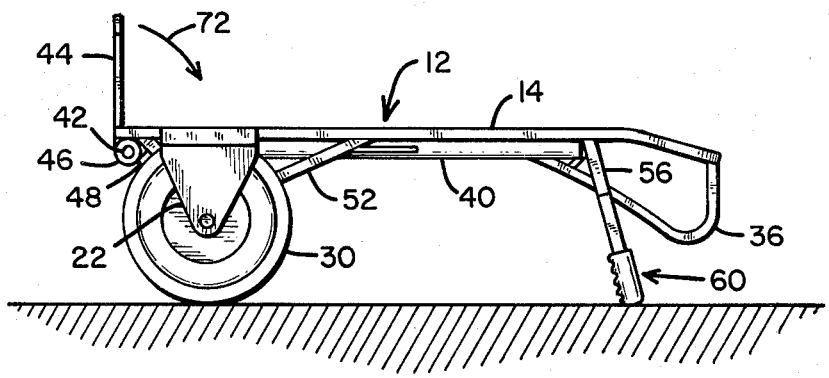
FIG. 3 is a side view of the preferred embodiment when disposed in its generally horizontal orientation.

Now, with reference to FIG. 3, it can be seen that at the leftmost end of the frame 12, which is the lower end of the frame when the cart is in its upright disposition, a pivot rod 42 which extends crosswise between the lower ends of the frame members 14 and 16. A toe plate 44 is also provided which is formed from a generally rectangular piece of metal and which has welded thereto a length of tubing 46. The pivot rod 42 passes through the central bore of the tube member 46 such that the toe plate 44 can be rotated from the disposition shown in FIG. 3 to a position which is generally flush with the plane defined by the side members 14 and 16. A suitable stop 48 is provided which prevents further counter-clockwise rotation of the toe plate 44 from the position illustrated in the view of FIG. 3.

Again, with reference to FIG. 2, and also with reference to FIG. 4, the axle member 26 is further structurally supported with respect to the side members 14 and 16 by generally V-shaped brackets 50 and 52 which have their free ends welded to the side members 14 and 16 and which are connected at their apex to the axle member 26 as by welding.

An additional generally V-shaped structural member 54 has its free ends welded to the members 50 and 52 and its apex extending rearwardly or downwardly (depending upon the relative orientation of the cart). The purpose of this member 54 will be described later.

Also welded to the side members 14 and 16 proximate the intersection of the cross member 18 therewith are first and second rearwardly extending tubular stubs 56 and 58 which project somewhat outwardly and rearwardly at an angle which is oblique to the rear surfaces of the rectangular side members. First and second handle members 60 ad 62 are also included and include a handle grip portion 64, an intermediate portion 66 and a terminal portion 68 of a reduced diameter which is sized so as to telescopically fit within the stubs 56 and 58. Wing screws 70 may be conveniently used to secure the handles 60 and 62 within their associated stubs 56 and 58.

With reference to FIG. 3, it can be seen that the length of the handles 60 and 62 are such that when the ends of the grip portions 64 thereof are abutting the ground, the frame 12 of the cart will be disposed in a generally horizontal position. That is, the length of the handles with respect to the diameter and mounting configuration of the wheels 30 are such that when the cart is disposed in FIG. 3, the side members 14 and 16 as well as the rollers 38 and 40 will be generally horizontal.

Now that the details of the construction of the preferred embodiment have been set forth, consideration will be given to the manner in which the cart of this invention may conveniently be used.

With reference to FIGS. 1 and 2, an operator wishing to transport such articles as boxes, bags, etc. will position the articles upon the toe plate 44. He will then grip the curved segment 36 of the structural member 34 and place one foot upon the V-shaped member 54 and will pull rearward on the portion 36 at the same time that he pushes downward with his foot on the member 54. This combination of forces will facilitate the tilting of the hand cart to its rearward position so that the articles to be transported and the toe plate 44 are balanced and supported on the wheels 30. Because of the outboard orientation of the wheels with respect to the sides of the frame, the unit of the present invention is extremely stable and will resist sideways tipping.

When transporting elongated rolls of yard goods such as carpeting and the like, again, the toe plate 44 is placed beneath the end of the roll to be transported. Now, when the cart is tipped, the outer surface of the roll will be cradled between the spaced apart rollers 38 and 40 and in the arcuate portions of the cross members 18 and 20. After reaching the desired destination, the cart may be laid down into the position illustrated in FIG. 3. The end of the carpet roll may then be lifted slightly and the toe plate 44 rotated in a clockwise direction until it is flush with the frame 12 as indicated by the arrow 72. The carpet roll may then be moved to the left so as to be better balanced upon the mating surfaces of cart 10. Specifically, the outer surface of the roll of material being handled will rest upon the rollers 38 and 40 such that lengths of material can be drawn from the roll while the roll is rotatable within the cradle defined by the rollers 38 and 40.

It should also be readily apparent from what has thus far been described that the cart 10 may also serve an additional function of a work bench. More specifically, when the toe plate 44 is rotated to its flush position with respect to the frame 12, a flat surface is provided onto which a piece of plywood or the like may be rested. This piece of plywood will be in a horizontal disposition and will provide a convenient working surface for the user.

while there has been shown and described a preferred embodiment of the present invention, it is to be understood that those skilled in the art will perceive of various changes and modifications, once having had the benefit of the foregoing teachings. Accordingly, the scope of the invention is to be determined from the following claims.

What is claimed is:

1. A multi-purpose hand truck comprising in combination:
   (a) a frame member formed from tubing having a generally rectangular cross-section, said frame member comprising first and second parallel and spaced apart, longitudinally extending, side members and at least two generally arcuate cross-members extending between and affixed to said side members at spaced apart locations along the length dimension thereof;

(b) a toe-plate hingedly affixed to said frame member proximate a first end thereof and adapted to be alternately positioned in a first orientation extending outwardly and perpendicularly from said frame or in a second orientation generally flush to said frame, the length of said toe-plate being insufficient to overlay the one of said arcuate cross-members closest to said first end of said frame member when said toe-plate is in said second orientation;

(c) at least two elongated roller means journaled for rotation between said two arcuate cross-members and oriented parallel to said side members;

(d) first and second generally L-shaped fender members affixed to said first and second side members, respectively, and extending laterally outwardly therefrom proximate said first end of said frame member for a first predetermined distance and an end portion bent rearwardly for a second predetermined distance, said end portions of said first and second fender members having an aperture formed therethrough, said toe-plate being disposed between said fender members and being generally coplanar with the portion of said L-shaped fender members extending laterally outwardly from said side members when said toe-plate is in said second orientation;

(e) a cylindrical rod affixed to said frame and extending transversely thereto proximate said first end thereof, the end portions of said rod passing through said apertures formed in said end portions of said first and second fender member;

(f) a pair of wheels of a predetermined diameter journaled for rotation on said cylindrical rod at a location outboard of said members and within said first predetermined distance of the lateral extension of said fender member; and (g) handle means affixed to said frame member proximate the second end thereof and extending rearwardly of said frame for a distance such that when the ends of said handle means abut a horizontal surface, said frame member is in a generally horizontal plane.

2. The hand cart as in claim 1 and further including:

(a) first and second V-shaped support members having the ends thereof affixed to said first and second side members of said frame and the apex thereof affixed to said cylindrical rod at points inward of said pair of wheels; and (b) a V-shaped foot engagable member affixed to said cylindrical rod and extending rearwardly therefrom in a direction transverse to the plane of said first and second side members.

* * * * *